United States Patent
Borgese et al.

(10) Patent No.: US 11,813,739 B2
(45) Date of Patent: Nov. 14, 2023

(54) ROBOT ARM, ROBOT HAVING A ROBOTIC ARM AND PACKAGING APPARATUS

(71) Applicant: SIDEL PARTICIPATIONS, Octeville-sur-Mer (FR)

(72) Inventors: Rossana Borgese, Parma (IT); Alessandro Tasora, Parma (IT); Dario Fusai, Parma (IT); Matteo Pambianchi, Parma (IT)

(73) Assignee: SIDEL PARTICIPATIONS, Octeville-sur-mer (FR)

( * ) Notice: Subject to any disclaimer, the term of this patent is extended or adjusted under 35 U.S.C. 154(b) by 0 days.

(21) Appl. No.: 17/878,881

(22) Filed: Aug. 1, 2022

(65) Prior Publication Data

US 2023/0036269 A1    Feb. 2, 2023

(30) Foreign Application Priority Data

Aug. 2, 2021 (EP) .................................. 21189008

(51) Int. Cl.
  *B25J 17/00* (2006.01)
  *B25J 17/02* (2006.01)
  *B25J 21/00* (2006.01)

(52) U.S. Cl.
  CPC ........... *B25J 17/0241* (2013.01); *B25J 17/00* (2013.01); *B25J 21/005* (2013.01)

(58) Field of Classification Search
  CPC . B25J 17/0241; B25J 15/0408; B23B 29/244; B23B 29/246
  See application file for complete search history.

(56) References Cited

U.S. PATENT DOCUMENTS

| 4,766,755 A * | 8/1988 | Allen ..................... B44D 3/006 68/213 |
| 4,979,284 A | 12/1990 | Mcmurtry et al. |
| 2016/0016269 A1 | 1/2016 | Maffeis |
| 2020/0407207 A1* | 12/2020 | Lichnewsky .......... C12M 23/38 |

FOREIGN PATENT DOCUMENTS

| EP | 3493955 B1 | 4/2020 |
| FR | 2600573 A1 | 12/1987 |

OTHER PUBLICATIONS

European Search Report for EP21189008 dated Jan. 28, 2022.

* cited by examiner

*Primary Examiner* — Gregory Robert Weber (57) ABSTRACT

A robotic arm comprising a first arm portion, a second arm portion, the second arm portion moveable between a first axial position, in which the first arm portion and the second arm portion are mutually spaced from each other along said axis, and a second axial position, in which a first end of first arm portion and a second end of the second arm portion are in contact to define a housing, a head rotatable with respect to the first arm portion and around said axis; and a robotic joint. The joint is configured for adopting an operative condition, to make the second arm portion integral with the head. The robotic arm is configured so that said operative condition corresponds to said second axial position and said second angular position and the robotic arm is configured so that, in said operative condition, the joint is located within said housing.

15 Claims, 6 Drawing Sheets

ROBOT ARM, ROBOT HAVING A ROBOTIC ARM AND PACKAGING APPARATUS

FIELD OF INVENTION

The present invention relates to a robot arm, in particular a robot arm configured to operate within a sterile and/or aseptic environment, even more particular within a sterile and/or aseptic environment of an apparatus for the packaging of pourable products.

BACKGROUND

Automatic packaging apparatuses for the packaging of pourable food products, e.g. for the packaging of pourable food products into receptacles such as bottles, cans or the like, are known.

Some packaging apparatuses are known to comprise an aseptic environment so as to package the pourable food products within the aseptic environment. These kinds of apparatuses comprise an isolation chamber separating an aseptic and/or sterile inner environment from an outer environment, and at least one treatment machine, such as a filler, a capper, a blow molder or similar, arranged within the inner environment.

During production or during a rest, it may become necessary to execute certain operations within the inner environment. Known operations can e.g. be the taking of probes for quality control issues, accessing and/or replacing and/or repairing portions of the treatment machine and the like.

When accessing the inner environment, one wants to avoid compromising the sterility and/or aseptic conditions within the inner environment. Thus, the apparatus may e.g. be equipped with gloves, having an access point for a hand and/or arm being in fluidic connection with the outer environment. However, such solutions have limited applications and, thus, a series of operations lead to a technical operator needing to access the inner environment, which, after termination of the technical operator's activities, leads to the necessity of executing a sterilization cycle.

Thus, a desire is felt in the sector to provide means for overcoming one or more of the aforementioned drawbacks.

A further desire is felt in the sector to provide for improved packaging apparatuses for the packaging of pourable products.

SUMMARY OF INVENTION

It is therefore an object of the present invention to provide means to overcome, in a straightforward and low-cost manner, the aforementioned drawbacks.

Advantageously, it is therefore an object of the present invention to provide a packaging apparatus to overcome, in a straightforward and low-cost manner, the aforementioned drawbacks.

According to the present invention, there is provided a robotic arm as claimed in claim 1.

Preferred non-limiting embodiments are claimed in the claims being directly or indirectly dependent on claim 1.

According to the present invention, there is also provided a robot according to claim 15.

According to the present invention, there is provided an apparatus according to claim 16.

BRIEF DESCRIPTION OF THE DRAWINGS

A non-limiting embodiment of the present invention will be described by way of example with reference to the accompanying drawings.

DETAILED DESCRIPTION

Figure 1:
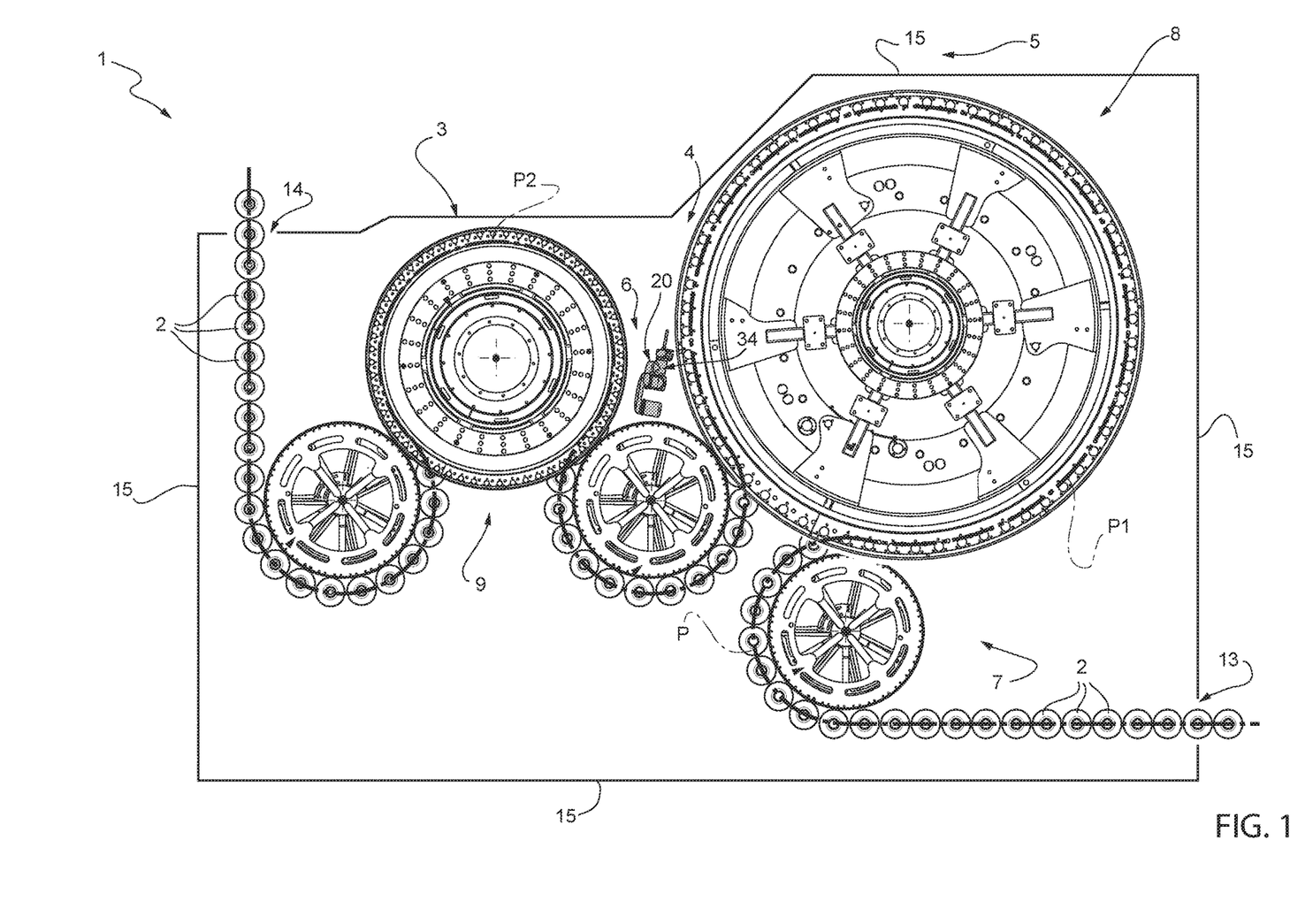
FIG. 1 is a schematic top view of an apparatus having a robot according to the present invention, with parts removed for clarity.

Number 1 in FIG. 1 indicates as a whole a packaging apparatus for the packaging of a pourable product, in particular a pourable food product.

Packaging apparatus 1 may be an automatic packaging apparatus configured for packaging the pourable product, in particular the pourable food product, into receptacles 2. The receptacle can be bottles, jars, vessels, containers or the like. The receptacles can be made of base components, like glass, paper or cardboard, plastics, aluminum, steel, and composites.

The pourable product may be a pourable food product such as a carbonated liquid (e.g. sparkling water, soft drinks and beer), a non-carbonated liquid (including still water, juices, teas, sport drinks, wine, milk, etc.), an emulsion, or a beverage containing a pulp.

Each receptacle 2 may comprise a main body holding the pourable product and a cap for closing the main body. The closures may be crown corks, screw caps, sports caps, stoppers or similar (and being produced from a variety of materials such as plastics and metal).

The apparatus comprises a machine for the packaging of a pourable product. The apparatus comprises an inner environment 4, in which the machine is located. The apparatus is configured so that said environment is aseptic and/or sterile.

The apparatus 1 comprises a robot 6. Robot 6 is configured for operating within the inner environment 4. Robot 6 comprises a robotic arm 20.

Apparatus 1 may comprise an isolation chamber 3 separating the (sterile and/or aseptic) inner environment 4 from an outer environment 5.

The apparatus can comprise a plurality of treatment machines.

In more detail, each machine may be configured for executing at least one treatment step. In particular, each treatment step may contribute (in one way or another) to the packaging of the pourable product.

E.g. one treatment machine may be a conveying machine 7 configured for advancing (a succession of) receptacles 2 along an advancement path P within inner environment 4 and/or isolation chamber 3.

Alternatively, or in addition, a treatment machine may be a filling machine 8, which is arranged within inner environment 4. The filling machine is configured for filling receptacles 2 with the pourable product, during their advancement along at least a filling portion P1 of advancement path P.

Alternatively, or in addition, a treatment machine may be a capping machine 9. The capping machine 9 is arranged within inner environment 4. The capping machine 9 is configured for capping filled receptacles 2, during their advancement along at least a capping portion P2 of advancement path P. The capping portion P2 is arranged, according to the advancement direction of the receptacles 2, downstream of filling portion P1.

According to the specific embodiment shown in FIG. 1, apparatus 1 may comprise conveying machine 7, filling machine 8 and capping machine 9, or may comprise filling machine 8 and capping machine 9.

In addition, or alternatively, apparatus 1 may comprise a filling and capping machine. The filling and capping machine is configured for filling receptacles 2 with the pourable product and for capping the filled receptacles 2.

In addition, or alternatively, a treatment machine can be a blowing machine, for forming receptacles 2 from preforms.

In more detail, isolation chamber 3 may comprise an inlet 13 and an outlet 14. The inlet 13 is configured for inputting the receptacles 2 or the preforms into inner environment 4. The outlet 14 is configured for outputting the treated receptacles 2 from the inner environment 4.

Furthermore, isolation chamber 3 may comprise a plurality of walls 15 (only some shown) delimiting inner environment 4. For example, each wall can delimit the inner environment 4 on a respective side. The isolation chamber 3 carries the inlet 13 and the outlet 14.

Apparatus 1 may comprise a conditioning unit configured to control an ambient condition, such as temperature and/or humidity and/or sterility and/or cleanliness and/or an airflow (direction), within inner environment 4.

More specifically, robot 6 may comprise a base. The base carries the robotic arm 20.

Preferentially, robotic arm 20 may comprise at least one pair of arm portions. The pair of arm portions can comprise for example an end effector and a wrist carrying the end effector. The pair can alternatively comprise the wrist and a forearm. The pair can alternatively comprise the forearm and an elbow. The pair can alternatively comprise the elbow and a biceps portion. The pair can alternatively comprise the biceps portion and a shoulder. The pair can alternatively comprise the shoulder and a tower portion.

Generally, the pair comprises a first arm portion 21 and a second arm portion 22.

The further details will be explained with reference to FIGS. 2 to 10. FIGS. 2 to 5 refer to an example in which the first arm portion 21 is the shoulder and second arm portion 22 is the biceps portion.

Figure 2:
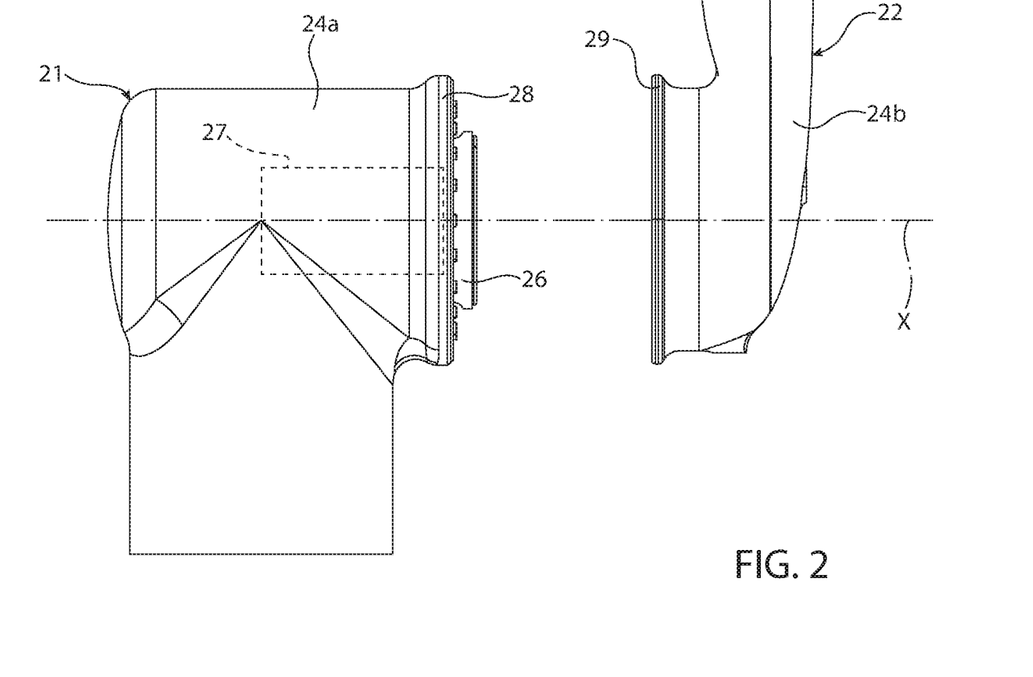
FIG. 2 is a partially exploded lateral view of a portion of the robot of FIG. 1, in a situation in which a second arm portion of a robotic arm of the robot adopts a first axial position with respect to a first arm portion of the same robotic arm, with parts removed for clarity.
Figure 3:
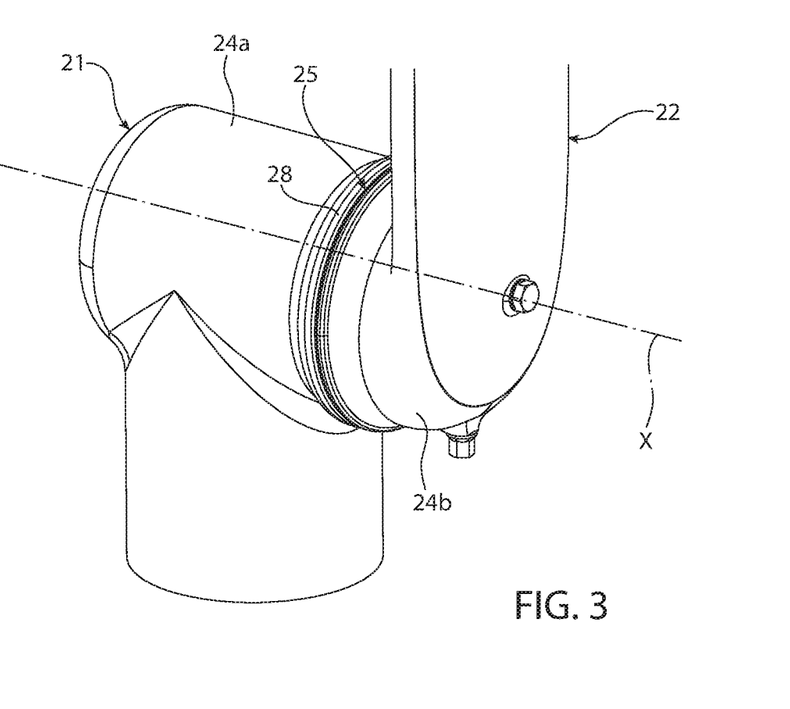
FIG. 3 is a perspective view of the portion of FIG. 2, in a situation in which the second arm portion adopts a second axial position with respect to the first arm portion, with parts removed for clarity.
Figure 4:
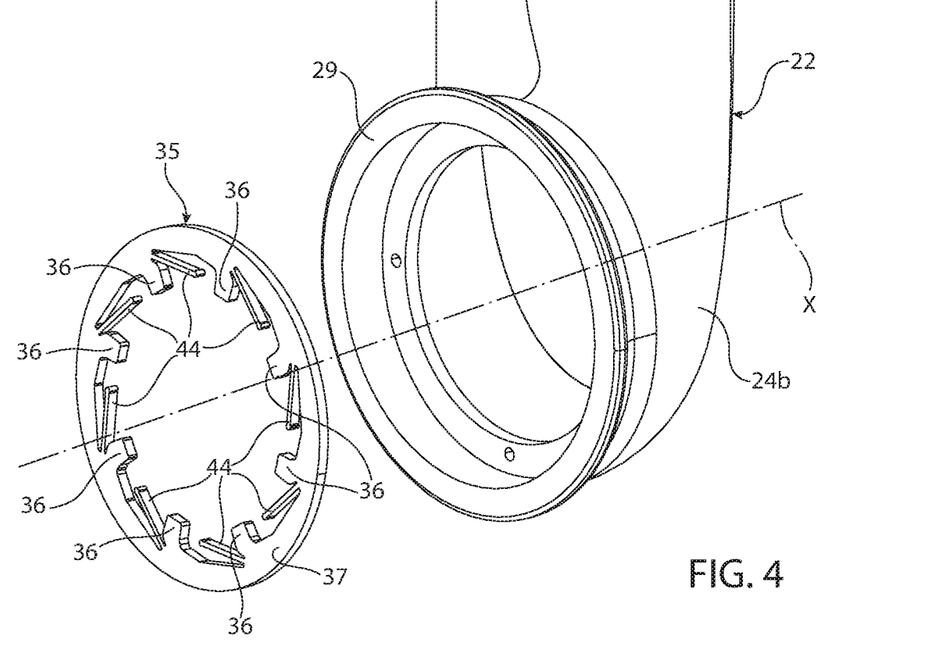
FIG. 4 is a perspective view of the second arm portion, and a portion of a robotic joint of the robotic arm, with parts removed for clarity.
Figure 6:
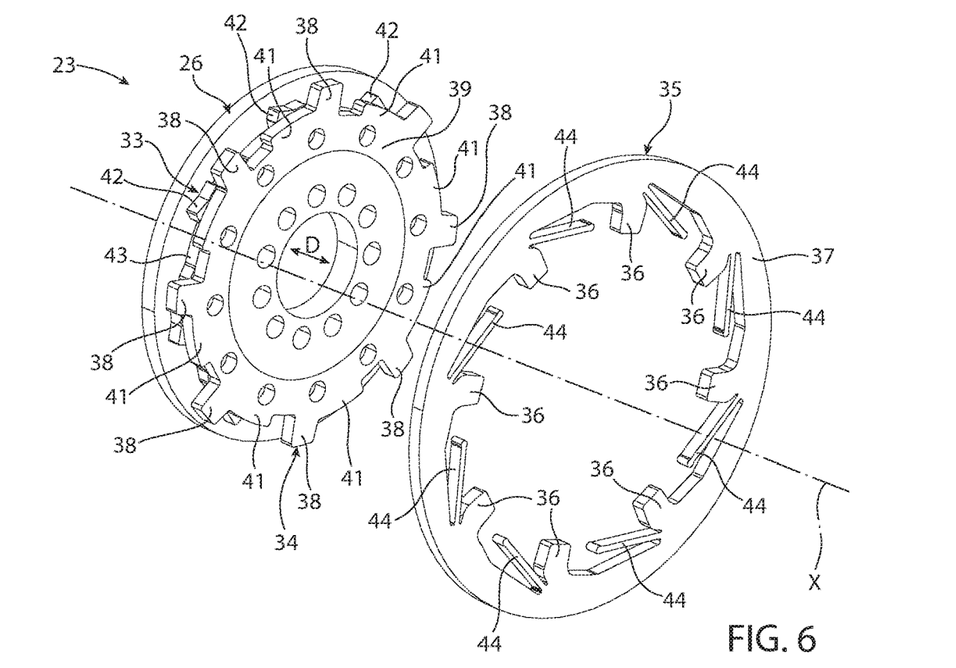
FIG. 6 is a perspective view of the robotic joint, in a condition corresponding to the second arm portion adopting the first axial position, with parts removed for clarity.

Robotic arm 20 is configured so that second arm portion 22 can be subjected to a relative axial movement with respect to first arm portion 21. The relative axial movement is along an axis X, and between a first axial position and a second axial position. FIGS. 2 and 6 are referred to a situation in which second arm portion 22 is adopting the first axial position. FIG. 3 is referred to a situation in which second arm portion 22 is adopting the second axial position.

In the first axial position, the first arm portion 21 and the second arm portion 22 are mutually spaced from one another along axis X. In the second axial position, the first arm portion 21 and second arm portion 22 are axially in mutual mechanical contact, thereby defining a common housing 25. The common housing 25 is visible in FIG. 3.

The first arm portion 21 defines or has at least one respective first end 28. The second arm portion 22 defines or has at least one respective second end 29. Each of the first end 28 and second end 29 is an axial end. In the second axial position of the second arm portion 22, the first end 28 of the first arm portion 21 and the second end 29 of the second arm portion 22 are axially in mutual mechanical contact, so that the first arm portion 21 and the second arm portion 22 define the common housing 25.

First arm portion 21 comprises a first shell 24a. Second arm portion 22 comprises a second shell 24b. The arm 20 is configured so that the first shell 24a and the second shell 24b define together the common housing 25, when the second arm portion 22 adopts the second axial position.

The relative axial movement can be obtained by moving and manipulating the first arm portion 21, or by moving and manipulating the second arm portion 22, or by moving and manipulating both the first arm portion 21 and the second arm portion 22.

The arm 20 comprises a head 26. The head 26 is supported by said first arm portion 21. The arm 20 is configured so that the head 26 is rotatable with respect to the first arm portion 21 and around the axis X.

The arm 20 comprises a motor 27. The arm 20 is configured so that the motor 27 rotates the head 26 with respect to the first arm portion 21 and around the axis X. The motor 27 is supported by the first arm portion part 21. The motor 27 is showed only in FIG. 2. The head 26 is showed in FIGS. 2 and 10.

The motor 27 is positioned at least partially or completely within the first housing 24a.

Figure 7:
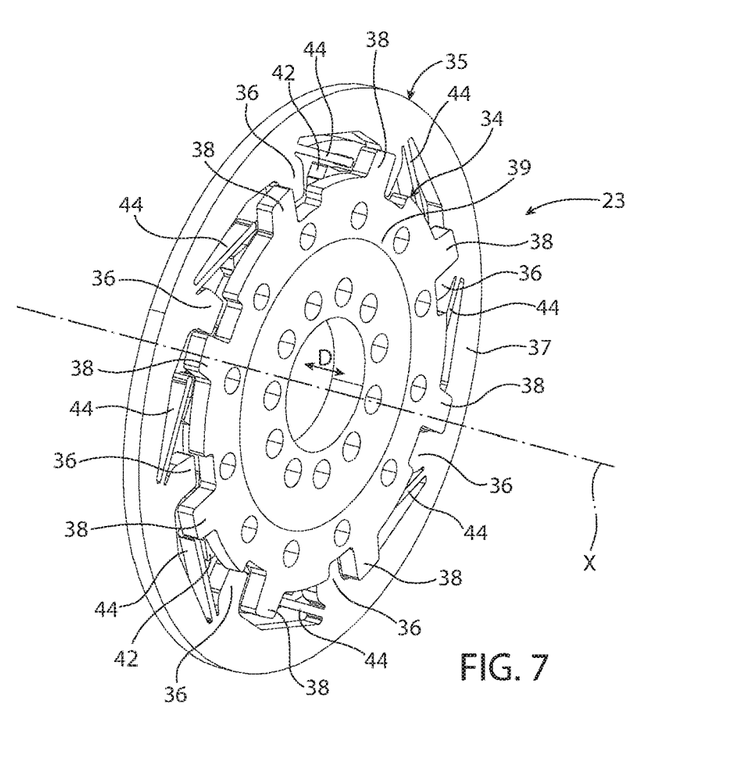
FIG. 7 is a perspective of the robotic joint, in a condition corresponding to the second arm portion adopting the second axial position and a first angular position with respect to the first arm portion, with parts removed for clarity.
Figure 8:
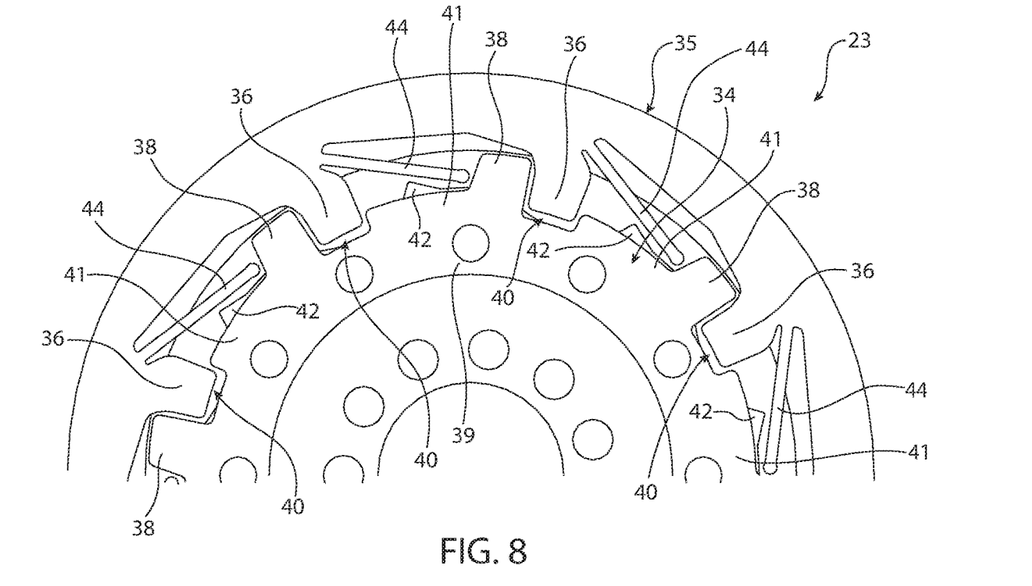
FIG. 8 is a schematic frontal and partial view of the robotic joint, in the condition of FIG. 7, with parts removed for clarity.
Figure 9:
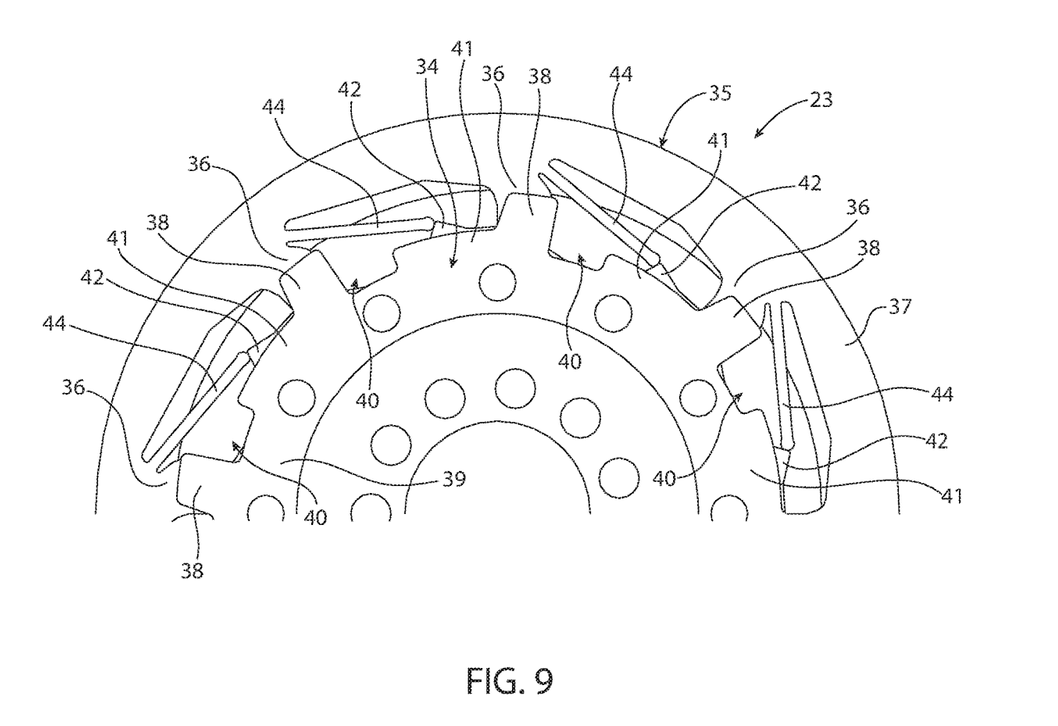
FIG. 9 is a schematic frontal and partial view of the robotic joint, in a condition corresponding to the second arm portion of the robot adopting the second axial position and a second angular position with respect to the first arm portion, with parts removed for clarity.
Figure 10:
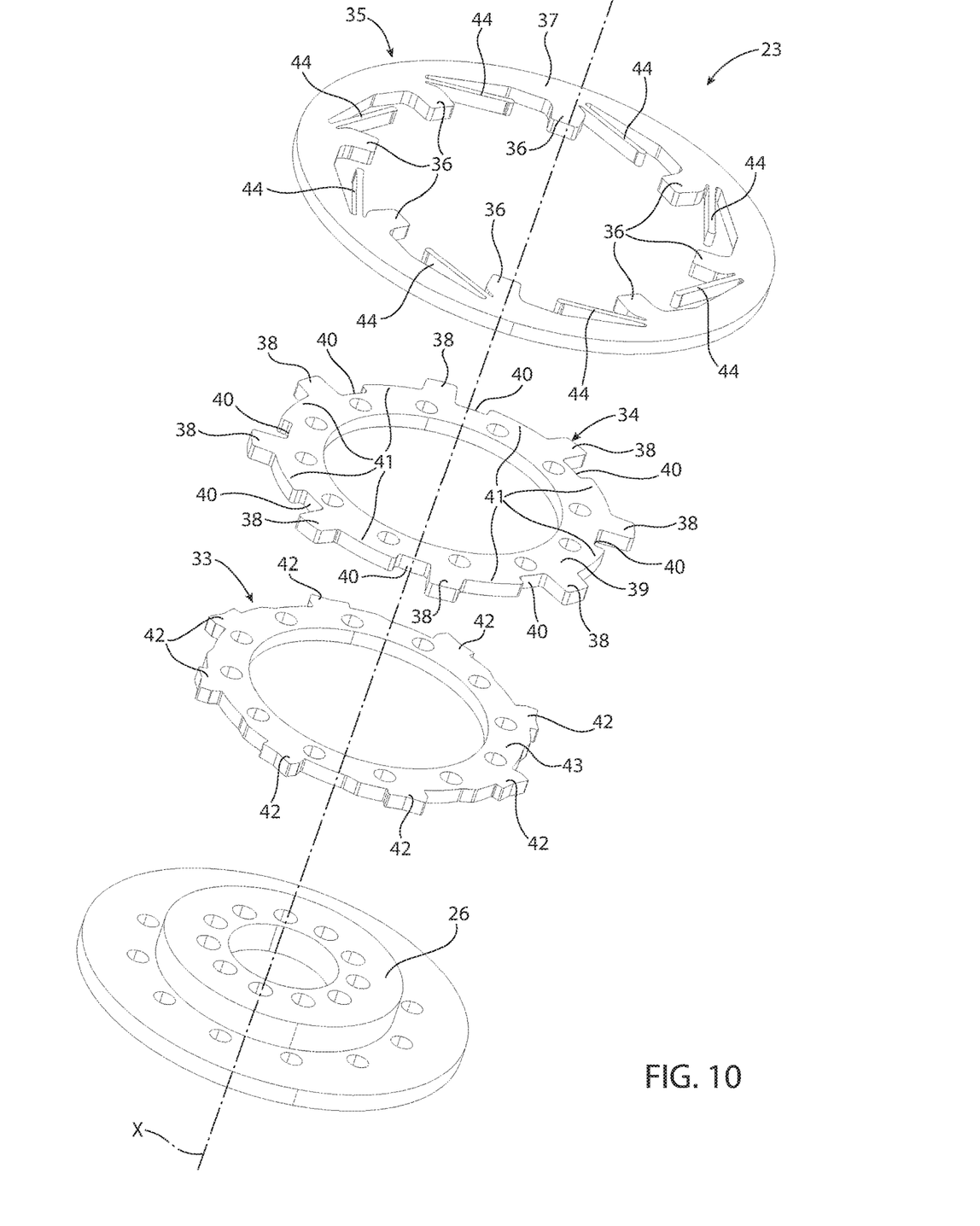
FIG. 10 is an exploded view of the robotic joint, with parts removed for clarity.

The arm 20 is configured so that the second arm portion 22, when adopting said second axial position, can be subjected to a relative rotational movement. The relative rotational movement is with respect to the first arm portion 21 and around said axis X. The relative rotational movement is between a first angular position and a second angular position. As will be clearer hereinafter, FIGS. 7 and 8 are referred to a condition in which the second arm portion 22 is adopting the second axial position and the first angular position. As will be clearer hereinafter, FIG. 9 is referred to a condition in which the second arm portion 22 is adopting the second axial position and the second angular position.

The relative rotational movement can be obtained by moving and manipulating the first arm portion 21, or by moving and manipulating the second arm portion 22, or by moving and manipulating both the first arm portion 21 and the second arm portion 22.

The arm 20 comprises a robotic joint 23. The robotic joint 23 is globally supported partially by the first arm portion 21 and partially by the second arm portion 22.

Figure 5:
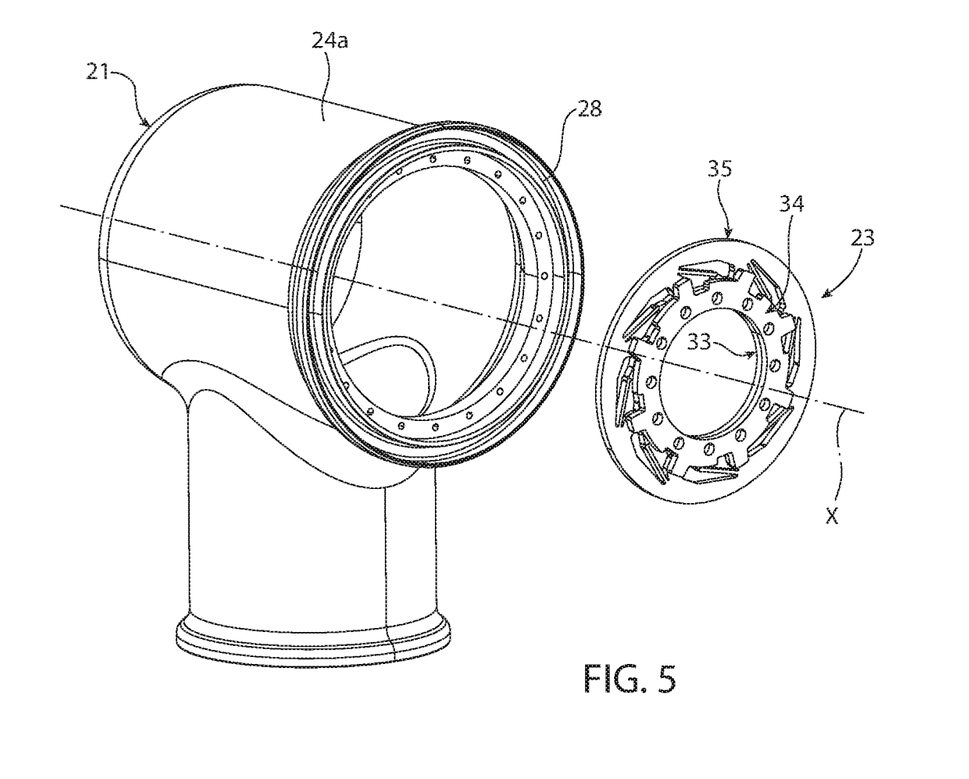
FIG. 5 is a perspective view of the first arm portion and the robotic joint, with parts removed for clarity.

The joint 23 is configured for adopting an operative condition. FIGS. 5 and 9 are referred to a condition in which the robotic joint 23 is adopting the operative condition. The arm 20 is configured so that, by means of the joint 23 adopting the operative condition, the second arm portion 22 can be operatively integral with the rotation of the head 26 around the axis 26.

In particular, when joint 23 is in the operative condition, second arm portion 22 is operatively and fixedly coupled to head 26. In this way, any rotational speed of head 26 around axis X may be operatively transferred to second arm portion 22 so as to induce also a rotation of second arm portion 22 around axis X.

Robotic arm 20 is configured so that the operative condition of robotic joint 23 corresponds to the second axial position and the second angular position of the second arm portion 22. The robotic joint 20 is configured so that the operative condition of robotic joint 23 is caused by the second arm portion 22 adopting the second axial position and the second angular position with respect to the first arm portion 21. Robotic arm 20 is configured so that the operative condition of the joint 23 is defined by the second arm portion 22 adopting the second axial position and the second angular position with respect to the first arm portion 21. Robotic arm 20 is configured so that the operative condition of the joint 23 corresponds to the second arm portion 22 adopting the second axial position and the second angular position. The joint 23 can be caused to pass from a not operative condition to the operative condition by carrying out a mounting method. The mounting method is for mounting the robotic arm 20. The mounting method comprises causing the second arm portion 22 to perform the axial movement in the direction from the first axial position to the second axial position, and subsequently by causing the second arm portion 22 to perform the rotational movement in the direction from the first angular position to the second angular position. The joint 23 can be caused to pass from the operative condition to the not operative condition by carrying out a demounting method. The demounting method is for demounting the robotic arm 20. A demounting method comprises causing the second arm portion 22 to perform the rotational movement in the direction from the second angular position to the first angular position, and subsequently by causing the second arm portion 22 to perform the axial movement in the direction from the second axial position to the first axial position.

The arm 20 is configured so that the operative condition of the joint 23 corresponds to the joint 23 being arranged or located within the housing 25. The arm 20 is configured so that the operative condition of the joint 23 corresponds to the joint 23 being arranged or located completely within the housing 25. The arm 20 is configured so that the joint 23, when adopting the operative condition, is arranged or located within the housing 25. The arm 20 is configured so that the joint 23, when adopting the operative condition, is arranged or located completely within the housing 25.

It is to be noted that any screw visible in FIG. 3 is not part of the robotic joint 23 and is not aimed to contribute to any function carried out by the robotic joint 23.

Therefore, robotic joint 23 is operatively protected within housing 25 defined by robotic arm 20, and no part of the joint 23 protrudes out of the housing 25. On the one side this helps to maintain the aseptic condition within inner environment 4 as it is lowered or eliminated the risk that the mechanical configuration of the joint 23 can be a source of contamination, which contamination would diffuse from robotic arm 20 into inner environment 4. The joint 23 is configured for adopting an idle condition. FIGS. 7 and 8 are referred to a situation in which the robotic joint 23 is adopting the idle condition. The arm 20 is configured so that, when the joint 23 adopts the idle condition, the second arm portion 22 is not yet operatively integral with the rotation of the head 26 around the axis X.

Robotic arm 20 is configured so that the idle condition of robotic joint 23 corresponds to the second axial position and the first angular position of the second arm portion 22. The robotic joint 20 is configured so that the idle condition of robotic joint 23 is caused by the second arm portion 22 adopting the second axial position and the first angular position with respect to the first arm portion 21. Robotic arm 20 is configured so that the idle condition of the joint 23 is defined by the second arm portion 22 adopting the second axial position and the first angular position. Robotic arm 20 is configured so that the idle condition of the joint 23 corresponds to the second arm portion 22 adopting the second axial position and the first angular position.

During the mounting method, the axial movement in the direction from the first axial position to the second axial position, brings the joint 23 in the idle condition. Subsequently, the angular movement in the direction from the first angular position to the second angular position brings the joint 23 from the idle condition to the operative condition.

During the demounting method, the rotational movement in the direction from the second angular position to the first angular position, brings the joint 23 in the idle condition. Subsequently, the axial movement in the direction from the second axial position to the first axial position brings the joint 23 from the idle condition to the not operative condition.

Therefore, the mounting method and/or the demounting method can be quicker and/or simpler. In this way, the assembling and/or the disassembling of the robot 6 can be quicker and/or simpler.

Arm 20 may comprise one or more sealing elements. The arm 20 is configured so that, in both the idle condition and the operative condition of the joint 23, the one or more sealing elements are arranged between the first arm portion 21, in particular the respective end 28, and the second arm portion 22, in particular the respective end 29, so as to further guarantee sealing of housing 25.

The arm 20 is configured so that, in the operative condition of the joint 23, the operation of motor 27 cannot bring the joint 23 from the operative condition to the idle condition, in particular for the reasons, which will be explained further below.

The joint 23 comprises a first disk 33 mounted on or fixed to the head 26. The joint 23 comprises a second disk 34 mounted on or fixed to the first disk 33. The joint 23 comprises a third disk 35 mounted on or fixed to the second arm portion 22. Therefore the first disk 33 and the second disk 34 are supported by the first arm portion 21, and the third disk 35 is supported by the second arm portion 22.

The joint 23 is configured so that the operative condition corresponds to or is caused by an axial coupling and a rotational coupling. The axial coupling is along said axis X and is between the third disk 35 and the second disk 34. The rotational coupling is around said axis X and is between the third disk 35 and the first disk 33.

In this way, the arm 20 is configured so that said axial movement and rotational movement of the second arm portion 22, correspond together to a bayonet movement of the third disk 35 with respect to the second disk 34. In this way the arm 20 is provided with a robotic joint 23 configured for lowering or eliminating the risks of contamination, and configured simultaneously for making the mounting and demounting methods simpler and quicker. In the operative condition of the robotic joint 23, a relative axial movement and an angular movement of third disk 35 with respect to head 26 along and about axis X are at least limited or totally blocked.

The rotational coupling corresponds to a coupling torque which is greater than a lower limit. The lower limit corresponds to the maximum operational torque of the motor 27. In this way the rotational coupling can be operatively maintained, during the use of the robot 6. The coupling torque is smaller than an upper limit.

The motor 27 comprises a reducer or gear unit. The upper limit corresponds to a maximum bearable torque of the reducer or gear unit of the motor 27. In this way, the demounting of the arm 20 does not cause any damage to the motor 27.

The third disk 35 comprises a plurality of teeth 36.

The teeth 36 of the third disk 35 are angularly distributed around the axis X. The second disk 34 comprises a plurality of teeth 38. The teeth 38 of the second disk 34 are angularly distributed around the axis X.

The joint 23 is configured so that, in said first axial position of the second arm portion 22, the teeth 36 of the third disk 35 are angularly staggered, around said axis X, with respect to the teeth 38 of the second disk 34.

The joint 23 is configured so that said axial movement corresponds to the passage of each tooth 36 of the third disk 35 between two respective angularly consecutive teeth 38 of the second disk 34.

In this way the axial movement can be obtained while the second disk 34 is mounted, to simplify the mounting and the demounting methods.

The second disk 34 comprises a plurality of slots 40. The slots 40 are angularly distributed around the axis X. Each slot 40 is defined between two respective angularly consecutive teeth 38 of the second disk 34.

The joint 23 is configured so that each slot 40, during the axial movement, guides the passage of a respective tooth 36 of the third disk 35 between two respective angularly consecutive teeth 35 of the second disk 34.

In this way the movement of the second arm portion 22 between the first axial position and the second axial position can be guided by a component belonging to the same joint 23. Therefore the mounting and the demounting methods are furtherly simplified.

The second disk 34 comprises a plurality of auxiliary portions 41 which are angularly distributed around axis X. Each auxiliary portion 41 is arranged between two respective angularly consecutive teeth 38 of the second disk 34. The second disk 34 is configured so that the angular extension of each slot 40 around the axis X is delimited by a respective tooth 38 of the second disk 34 and a respective auxiliary portion 41.

By providing for auxiliary elements 41 it is possible to guarantee a correct alignment of third disc 35 with respect to second disc 34, in particular during the mounting.

To obtain said axial coupling, the arm 20 is configured so that the rotational movement of the second arm portion 22 in the direction from the first angular position to the second angular position, causes each tooth 36 of the third disk 35 to adopt the same angular position, around said axis X, with respect to a respective tooth 38 of the second disk 34. In this way, following the rotational movement in the direction from the first angular position to the second angular position, each tooth 36 of the third disk 35 is spatially interposed, along an axial direction parallel to the axis X, between the head 26 and a respective tooth 38 of the second disk 34. Said direction is indicated by arrow D of FIGS. 6 and 7. Following the rotational movement in the direction from the first angular position to the second angular position, each tooth 36 of the third disk 35 becomes angularly aligned with a respective tooth 38 of the second disk 34.

In this way, one obtains that an axial movement of second arm portion 22 with respect to first arm portion 21 and along axis X, is blocked due to each tooth 36 of the third disk 35 being spatially interposed between a respective tooth 38 of the second disk 34 and head 26. The second disk 34 is spaced from the head 26, along said direction D, by an axial distance designed so that said axial coupling corresponds to each tooth 36 of the third disk 35 being locked by mechanical contact between a respective tooth 38 of second disk 34 and the head 26. Therefore, the axial coupling is increased. In this way the robotic arm 20 can be more accurate during operation.

The first disk 33 comprises a plurality of teeth 42. The teeth 42 of first disk 33 are angularly distributed around said axis X.

To obtain said rotational coupling, the robotic arm 20 is configured so that said angular movement, in the direction from the first angular position to the second angular position, causes each tooth 36 of the third disk 35 to mechanically contact a respective tooth 42 of the first disk 33.

Therefore, it is possible to obtain simultaneously the axial coupling and the rotational coupling. In this way, the mounting method and the demounting methods can be quicker and simpler.

The third disk 35 comprises a plurality of engagement elements 44. The engagement elements 44 are angularly distributed around said axis X. Each engagement element 44 is angularly interposed between two respective angularly consecutive teeth 36 of the third disk 35.

To obtain said rotational coupling, the robotic arm 20 is configured so that said angular movement, in the direction from the first angular position to the second angular position, causes each engagement element 44 to mechanically lock against a respective tooth 42 of the first disk 33. In this way, the rotational coupling correspond, for each couple comprising a respective tooth 36 of the third disk 35 and a respective engagement element 44 of the third disk 35, to a mechanical contact between the tooth 36 of the third disk 35 and a respective tooth 42 of the first disk 33, and to the engagement element 44 being locked against another respective tooth 42 of the first disk 33. This situation can be appreciated on FIG. 9.

In this way, the rotational coupling acts both in clockwise direction and anticlockwise direction.

Therefore, the operative condition of the joint 23 corresponds to:

each tooth 42 of the first disk 33 being rotationally locked, around the axis X, between a respective engagement element 44 and a respective tooth 36 of the third disk 35;

each tooth 36 of the third disk 35 being axially locked, along a direction D which is parallel to the axis X, between the head 26 and a respective tooth 38 of the second disk 34.

Therefore, the rotational coupling torque can be increased with a very compact joint 23. In this way the efficacy of the joint 23 is improved.

Each engagement element 44 comprises a flexible tab. The arm 20 is configured so that said rotational movement in the direction from the first angular position to the second angular position, causes each flexible tab to fit against a respective tooth 42 of the first disk 33, by means of a snap motion. The use of a flexible tab which is able to be subjected to a snap motion, reduces the weight of the robotic joint 23.

The tab can be shaped to regulate the rotational coupling torque. In this way the flexibility during the manufacturing of the joint 23 is improved.

The arm 20 is configured so that, by means at least of the tabs of the third disk 35 and the teeth 42 of the first disk 33, the coupling torque is greater than the above lower limit and/or smaller than the above upper limit.

In particular, during the rotational movement of the second arm portion 22 in the direction from the first angular position to the second angular position, each engagement element 44, in particular the respective flexible tab, moves over the respective tooth 42 to execute the respective snap motion.

During the demounting method, a demounting torque in the direction from the second angular position to the first angular position must be applied on the third disk 35. The demounting torque must overcome the coupling torque, which is greater than the maximum operational torque of the motor 27 and/or smaller than the maximum bearable torque of the reducer or gear unit of the motor 27.

At least one of the first disk 33 and the second disk 34 protrudes from the first shell 24a. It can be possible that each of the first disk 33 and the second disk 34 protrudes from the first shell 24a. The third disk 35 is mounted within the second shell 24b. In this way, the robotic joint can be arranged within the housing 25 when the second arm portion 22 adopts the second axial position.

It can be possible, alternatively, that the first disk 33 and second disk 34 are mounted within the first shell 24a, and the third disk 35 protrudes from the second shell 24b.

The first disk 33 can comprise a main ring 43. The teeth 42 of the first disk 33 protrude radially from the main ring 43 of the first disk 33. The second disk 34 can comprise a main ring 39. The teeth 38 of the second disk 34 protrude radially from the main ring 39 of the second disk 34. The third disk 35 can comprise a main ring 37.

The teeth 36 and the engagement elements 44 of the third disk 35 protrude radially from the main ring 37 of the third disk 35.

The teeth 36 and the engagement elements 44 of the third disk 35 protrude radially inwards with respect to the axis X. The teeth 42 of the first disk 33 and the teeth 38 of the second disk 34 protrude radially outwards with respect to the axis X.

In this way, the disks can efficiently cooperate with each other to obtain the axial coupling and the rotational coupling, providing a very compact joint 23.

Alternatively, the teeth 36 and the engagement elements 44 of the third disk 35 can protrude radially outwards with respect to axis X, and the teeth 42 of the first disk 33 and the teeth 38 of the second disk 34 can protrude radially inward with respect to the axis X.

The advantages of robotic arm 20 and/or robot 6 and/or apparatus 1 will be clear from the foregoing description.

In particular, robotic arm 20 can be easily assembled and disassembled thereby also guaranteeing the possibility to use robotic arm 20 in an aseptic environment.

Another advantage resides in that the robotic joint 23 do not need the use of any element protruding out of the housing 25 when the joint 23 adopts the operative condition.

The first disk 33 can be made by means of an electro-erosion process. The second disk 34 can be made by means of an electro-erosion process. The third disk 35 can be made by means of an electro-erosion process. By means of an electro-erosion process, the shape of each disk can be as complicated as needed to make the mounting and the demounting methods as easy as possible. For example, the surface of the first disk 33 in each portion between two angularly consecutive teeth 42 of the first disk 33, can be shaped to avoid any interference with the third disk 35 during the axial movement in the direction from the first axial position to the second axial position, specifically after the third disk 35 has passed axially through the second disk 35. Also, this surface can be shaped to allow a radial centering of the first disk 33 by means of the rotational movement in the direction from the first angular position to the second angular position.

Clearly, changes may be made to robotic arm 20 and/or robot 6 and/or apparatus as described herein without, however, departing from the scope of protection as defined in the accompanying claims.

The invention claimed is:

1. A robotic arm (20), comprising:
a first arm portion (21);
a second arm portion (22), the robotic arm (20) being configured so that the second arm portion (22) can be subjected to an axial movement with respect to the first arm portion (21) and along an axis (X), between a first axial position, in which the first arm portion (21) and the second arm portion (22) are mutually spaced from each other along said axis (X), and a second axial position, in which a first end (28) of the first arm portion (21) and a second end (29) of the second arm portion (22) are axially in mutual contact to define a housing (25);
a head (26) which is supported by said first arm portion (21), the robotic arm (20) being configured so that the head (26) is rotatable with respect to the first arm portion (21) and around said axis (X);
a robotic joint (23);
wherein:
the robotic arm (20) is configured so that the second arm portion (22), when adopting said second axial position, can be subjected to a relative angular movement with respect to the first arm portion (21) and around said axis (X), between a first angular position and a second angular position;
the joint (23) is configured for adopting an operative condition, to make the second arm portion (22) integral with the head (26);
the robotic arm (20) is configured so that said operative condition corresponds to said second axial position and said second angular position;
the robotic arm (20) is configured so that, in said operative condition, the joint (23) is located within said housing (25);
wherein the robotic joint (23) comprises:
a first disk (33) mounted on and/or to the head (26);
a second disk (34) mounted on and/or to the first disk (33);
a third disk (35) mounted on and/or to the second arm portion (22);
wherein the joint (23) is configured so that the operative condition corresponds to an axial coupling along said axis (X) between the third disk (35) and the second disk (34), and to a rotational coupling around said axis (X) between the third disk (35) and the first disk (33); and
wherein the robotic arm (20) is configured so that said axial movement and angular movement of the second arm portion (22), correspond together to a bayonet movement of the third disk (35) with respect to the second disk (34).

2. The robotic arm according to claim 1, wherein:
each of the third disk (35) and the second disk (34) comprises a respective plurality of teeth (36; 38) angularly distributed around said axis (X);
the joint (23) is configured so that, in said first axial position of the second arm portion (22), the teeth (36) of the third disk (35) are angularly staggered, around said axis (X), with respect to the teeth (38) of the second disk (34); and
the joint (23) is configured so that said axial movement corresponds to the passage of each tooth (36) of the third disk (35) between two respective angularly consecutive teeth (38) of the second disk (34).

3. The robotic arm according to claim 2, wherein, to obtain said axial coupling, the robotic arm (20) is configured so that said angular movement, in the direction from the first angular position to the second angular position, causes each tooth (36) of the third disk (35) to adopt the same angular position, around said axis (X), with respect to a respective tooth (38) of the second disk (34), so that the axial coupling corresponds to each tooth (36) of the third disk (35) being spatially interposed, along an axial direction (D) parallel to the axis (X), between the head (26) and a respective tooth (38) of the second disk (34).

4. The robotic arm according to claim 3, wherein each tooth (38) of the second disk (34) is spaced from the head (26), along said direction (D), by an axial distance designed so that said axial coupling corresponds to each tooth (36) of the third disk (35) being locked by mechanical contact between a respective tooth (38) of second disk (34) and said head (26).

5. The robotic arm according to claim 3, wherein:
said first disk (33) comprises a plurality of teeth (42) angularly distributed around said axis (X);
to obtain said rotational coupling, the robotic arm (20) is configured so that said angular movement, in the direction from the first angular position to the second angular position, causes each tooth (36) of the third disk (35) to mechanically contact a respective tooth (42) of the first disk (33);
said third disk (35) comprises a plurality of engagement elements (44) angularly distributed around said axis (X), each engagement element (44) being angularly interposed between two respective angularly consecutive teeth (36) of the third disk (35);
to obtain said rotational coupling, the robotic arm (20) is configured so that said angular movement, in the direction from the first angular position to the second angular position, causes each engagement element (44) to lock against a respective tooth (42) of the first disk (33), so that the rotational coupling corresponds to each engagement element (44) being locked against a respective tooth (42) of the first disk (33);
to obtain said rotational coupling, the robotic arm (20) is configured so that said angular movement, in the direction from the first angular position to the second angular position, causes also each tooth (36) of the third disk (35) to mechanically contact a respective tooth (42) of the first disk (33), so that the rotational coupling corresponds also to each tooth (36) of the third disk (35) being in mechanical contact with a respective tooth (42) of the first disk (33).

6. The robotic arm according to claim 5, wherein:
the first disk (33) comprises a main ring (43), the teeth (42) of the first disk (33) protruding radially from the main ring (43) of the first disk (33);
the second disk (34) comprises a main ring (39) which is distinct from the main ring (43) of the first disk (33), the teeth (38) of the second disk (34) protruding radially from the main ring (39) of the second disk (34);
the third disk (35) comprises a main ring (37) which is distinct from the main rings (43, 39) of the first disk (33) and of the second disk (34), the teeth (36) and the engagement elements (44) of the third disk (35) protruding radially from the main ring (37) of the third disk (35);
wherein:
the teeth (36) and the engagement elements (44) of the third disk (35) protrude radially inwards with respect to the axis (X) and towards the axis (X), and the teeth (42) of the first disk (33) and the teeth (38) of the second disk (34) protrude radially outwards with respect to the axis (X) and away from the axis (X); or
the teeth (36) and the engagement elements (44) of the third disk (35) protrude radially outwards with respect to axis (X) and away from the axis (X), and the teeth (42) of the first disk (33) and the teeth (38) of the second disk (34) protrude radially inwards with respect to the axis (X) and towards the axis (X).

7. The robotic arm according to claim 5, wherein each engagement element (44) comprises a flexible tab;
the robotic arm (20) is configured so that said angular movement, in the direction from the first angular position to the second angular position, causes each flexible tab to lock against a respective tooth (42) of the first disk (33) by means of a snap motion.

8. The robotic arm according to claim 1, comprising a motor (27) for rotating the head (26) with respect to the first arm portion (21) and around the axis (X), the motor (27) being supported by the first arm portion (21).

9. The robotic arm according to claim 1, wherein the rotational coupling corresponds to a rotational coupling torque being greater than the maximum operative torque of the motor (27).

10. The robotic arm according to claim 9, wherein the motor (27) comprises a reducer or gear unit, the coupling torque being smaller than the maximum bearable torque of the reducer or gear unit.

11. The robotic arm according to claim 1, wherein said first arm portion (21) comprises a first shell (24a) and second arm portion (22) comprises a second shell (24b), the robotic arm (20) being configured so that, in the second axial position of the second arm portion (22), the first shell (24a) and the second shell (24b) together define said housing (25).

12. The robotic arm according to claim 11, wherein:
at least one of said first disk (33) and second disk (34) protrudes axially from the first shell (24a) and said third disk (35) is mounted within the second shell (24b); or
at least one of said first disk (33) and second disk (34) is mounted within the first shell (24a) and said third disk (35) protrudes axially from the second shell (24b).

13. A robot (6) comprising the robotic arm (20) according to claim 1, said robot (6) being configured for operating within an aseptic environment of an apparatus (1) for the packaging of a pourable product.

14. A packaging apparatus (1) for the packaging of a pourable product comprising:
an isolation chamber (3) defining a sterile and/or aseptic inner environment (4);
a treatment machine (7, 8, 9) positioned within the sterile and/or aseptic inner environment (4); and
the robot (6) according to claim 13.

15. A robotic arm (20), comprising:

a first arm portion (21);

a second arm portion (22), the robotic arm (20) being configured so that the second arm portion (22) can be subjected to an axial movement with respect to the first arm portion (21) and along an axis (X), between a first axial position, in which the first arm portion (21) and the second arm portion (22) are mutually spaced from each other along said axis (X), and a second axial position, in which a first end (28) of the first arm portion (21) and a second end (29) of the second arm portion (22) are axially in mutual contact to define a housing (25);

a head (26) which is supported by said first arm portion (21), the robotic arm (20) being configured so that the head (26) is rotatable with respect to the first arm portion (21) and around said axis (X);

a robotic joint (23);

wherein:

the robotic arm (20) is configured so that the second arm portion (22), when adopting said second axial position, can be subjected to a relative angular movement with respect to the first arm portion (21) and around said axis (X), between a first angular position and a second angular position;

the joint (23) is configured for adopting an operative condition, to make the second arm portion (22) integral with the head (26);

the robotic arm (20) is configured so that said operative condition corresponds to said second axial position and said second angular position;

the robotic arm (20) is configured so that, in said operative condition, the joint (23) is located within said housing (25);

wherein the robotic joint (23) comprises:

a first disk (33) mounted on and/or to the head (26);

a second disk (34) mounted on and/or to the first disk (33);

a third disk (35) mounted on and/or to the second arm portion (22);

wherein the joint (23) is configured so that the operative condition corresponds to an axial coupling along said axis (X) between the third disk (35) and the second disk (34), and to a rotational coupling around said axis (X) between the third disk (35) and the first disk (33), and wherein the rotational coupling corresponds to a rotational coupling torque being greater than the maximum operative torque of the motor (27).

\* \* \* \* \*